March 19, 1957     C. H. AGER     2,785,463
CREAM-CORN EXTRACTOR
Filed May 29, 1953

INVENTOR
Charles Herbert Ager

2,785,463

CREAM-CORN EXTRACTOR

Charles Herbert Ager, Portland, Oreg.

Application May 29, 1953, Serial No. 358,499

1 Claim. (Cl. 30—280)

My invention relates to improvements in a hand tool, designed and constructed to prepare and extract cream-corn from its ear, leaving the hulls securely attached to the cob.

I accomplish this by means of a hand-tool, the frame or body of which is so designed and constructed that it comfortably fits the grasp of the hand of the operator and serves as a handle and also as the main body of the tool. Formed integrally with one end of said handle is a series of sharp pointed plow-shaped teeth set diagonally across the major axis of the tool for tearing open the kernels without removing them from the ear. To the opposite end of the handle is attached the double-curved extractor blade.

In the drawing accompanying this specification:

Figure 1:
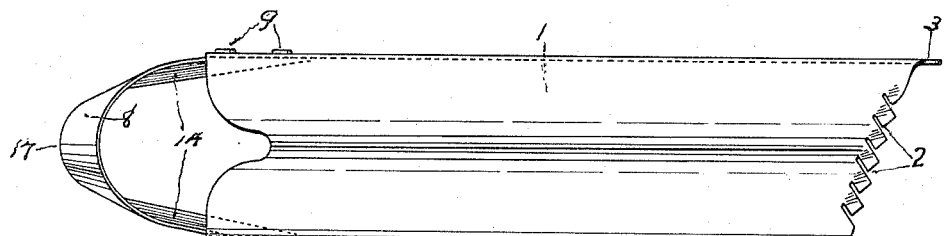
Fig. 1 is a plan-view of the tool.

In this specification, I describe the tool as a cream-corn extractor, although it has other uses, such for example as for scaling small fish.

In the drawing, similar numerals refer to similar parts or points throughout the several views.

The top of the frame is somewhat arched along its entire length, in order that its plow-like teeth may likewise be arched and closely fit the rounded surface of an ear of corn to which it is applied. The sides 12 and 13 are slightly canted inward, to provide better grip for the hand, and also to provide a slight twist to the ends of the double-curved extractor blade. The said twist increases the effectiveness of the blade in squeezing and forcing the cream-corn from the kernels. A slight outward cast of the frame at point 10, along a straight line to point 11, and inward cant of the subtended portion 16, provides for perfect fitting of the blade to the frame, and adds somewhat to the twist of the ends of the extractor blade and its effectiveness. Formed integrally with one end of the frame is a series of sharp-pointed plow-shaped teeth 2, Figs. 1, 2, 3, in a gang-plow arrangement, set obliquely across the major axis of the tool. The object of this oblique arrangement of the teeth is to prevent them from tearing particles of hulls loose from the cob. The sharp points of the teeth 2, Fig. 2, pierce every kernel a little below its center. As the tool is drawn from the stem-end to the tip of the ear, the sharp points and mold-boards of the plow-shaped teeth not only pierce every kernel, but slit and tear them open from the inside outward. Slitting and tearing of the hulls from inside, outward, leaves the edges of the slit and torn hulls turned outward, thereby providing freer exit for the cream-corn when the curved-blade is applied. The slits are widened and the content of the kernels is mixed and softened by means of each plow-shaped mold-board and its sharp point.

Figure 2:
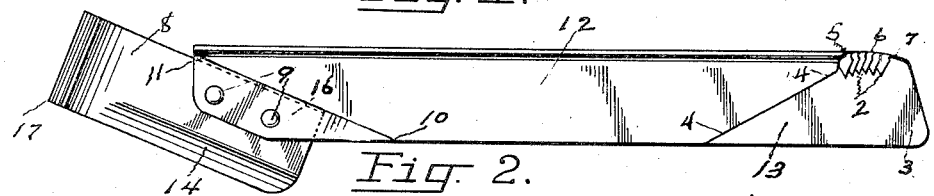
Fig. 2 is a side elevation, showing the plow-shaped teeth at one end of the handle and the double-curved extractor blade at the other end.
Figure 3:
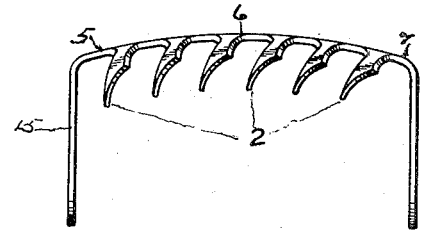
Fig. 3 is an end view, enlarged, showing the plow-shaped teeth more in detail.
Figure 5:
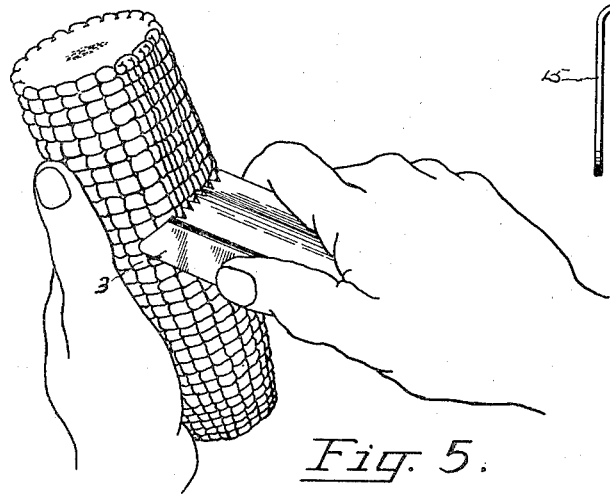
Fig. 5 is a perspective view, showing position of the ear, hands and tool in plowing operation.
Figure 4:
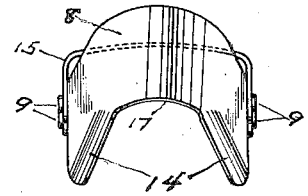
Fig. 4 is an end view of the double-curved extractor blade and its connection with the frame.
Figure 6:
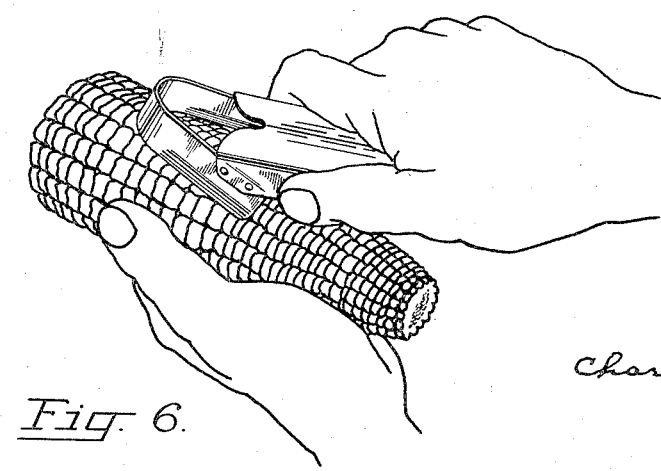
Fig. 6 is a perspective view, showing the ear, hands and tool in position to extract cream-corn from the kernels.

The projection 3, Figs. 1, 2 and 5, acts as a stabilizer to guide the tool along a straight course as it is drawn down the ear. The purpose of said stabilizer is therefore quite analogous to that of the land-side of the common plow.

The removal of the portion of side 12, Fig. 2, along the line 4—4, provides freer and better contact of the teeth with the kernels.

The effectiveness of the extractor blade 8 is chiefly due to its curves 14, 17. The elliptical curve 17 with its apex at the forward end of the blade, and the curve 14 extending along its side for about one-third of its entire length, constitute its two chief elements. And, additionally, both ends of the whole blade are twisted inwardly by the inward cant of the base 16, Fig. 2, to which they are attached. Thus the blade actually has three curves, and is very effective in squeezing, forcing out and upward, and removing all cream-corn from its kernels.

In this specification, I have selected highly polished chrome stainless-steel, brass rivets and aluminum as materials well suited for the construction of this tool. These materials retain a brilliant luster, are rust-proof and comparatively inexpensive.

I am aware that various tools are in use for extracting cream-corn, such as:

| Trenullo | 2,541,559 | October 13, 1951 | 30–136 |
|---|---|---|---|
| Schumacher | 2,505,917 | May 2, 1950 | 30–24 |
| Dowdle | 1,092,522 | April 7, 1914 | 56-400.01 |
| Bell | 1,591,738 | July 6, 1926 | 56-400.16 |
| McCown | 564,832 | July 28, 1896 |  | and perhaps many others; but I claim:

In a culinary tool for extracting cream corn from ears of corn, a handle, a semi-elliptical extractor blade on said handle having a pair of side walls and a closed end wall, said blade projecting longitudinally from one end of said handle and the side walls thereof being inclined upwardly at an obtuse angle relative to said handle, the bottom of said blade forming a scraping edge arranged to engage opened kernels of corn on the ear, said side walls being curved inwardly toward each other adjacent their bottom edges to impart a squeezing and pulling action together with said closed end on the kernels of the ear for extracting the contents of said kernels.

References Cited in the file of this patent

UNITED STATES PATENTS

| 90,522 | Gilroy | May 25, 1869 |
|---|---|---|
| 395,821 | Foote | Jan. 8, 1889 |
| 631,259 | Pancoast | Aug. 15, 1899 |
| 850,871 | Nagasse | Apr. 16, 1907 |
| 935,517 | Johnson | Sept. 28, 1909 |
| 959,269 | Starr | May 24, 1910 |
| 961,825 | Wells | June 21, 1910 |
| 983,515 | Pancoast | Feb. 7, 1911 |
| 1,547,386 | Hanson | July 28, 1925 |
| 1,739,517 | O'Loughlin | Dec. 17, 1929 |
| 2,266,209 | Jones | Dec. 16, 1941 |
| 2,447,301 | Wright | Aug. 17, 1948 |
| 2,577,407 | Dent | Dec. 4, 1951 |